(12) United States Patent
Pic et al.

(10) Patent No.: US 9,256,350 B2
(45) Date of Patent: Feb. 9, 2016

(54) SYSTEM FOR DISPLAYING HIERARCHICAL INFORMATION

(75) Inventors: Mickael Pic, Brossard (CA); Rozita Naghshin, Montreal (CA); Ralph Akhras, Montreal (CA); Mircea Turcu, Dollard des Ormeaux (CA); Paul Reinlein, St-Laurent (CA)

(73) Assignee: Nexsan Technologies Incorporated, Thousand Oaks, CA (US)

( * ) Notice: Subject to any disclaimer, the term of this patent is extended or adjusted under 35 U.S.C. 154(b) by 415 days.

(21) Appl. No.: 13/076,218

(22) Filed: Mar. 30, 2011

(65) Prior Publication Data

US 2012/0254805 A1 Oct. 4, 2012

(51) Int. Cl.
*G06F 3/0482* (2013.01)
*H04L 12/24* (2006.01)

(52) U.S. Cl.
CPC .............. *G06F 3/0482* (2013.01); *H04L 41/22* (2013.01)

(58) Field of Classification Search
CPC ........................... G06F 3/0482; G06F 3/04815
USPC .......................................................... 715/854
See application file for complete search history.

(56) References Cited

U.S. PATENT DOCUMENTS

| | | | |
|---|---|---|---|
| 5,515,486 A | 5/1996 | Amro | |
| 5,546,528 A | 8/1996 | Johnston | |
| 5,546,529 A * | 8/1996 | Bowers et al. | 715/848 |
| 6,266,098 B1 | 7/2001 | Cove | |
| 6,448,987 B1 | 9/2002 | Easty | |
| 6,628,313 B1 | 9/2003 | Minakuchi | |
| 6,880,132 B2 * | 4/2005 | Uemura | 715/848 |
| 7,036,090 B1 | 4/2006 | Nguyen | |
| 7,036,091 B1 | 4/2006 | Nguyen | |
| 7,134,095 B1 | 11/2006 | Smith | |
| 7,246,329 B1 | 7/2007 | Miura | |
| 7,266,781 B1 | 9/2007 | Burlowski | |
| 7,428,710 B2 | 9/2008 | Robbins | |
| 7,817,168 B2 * | 10/2010 | Nagiyama et al. | 345/661 |
| 7,827,502 B2 | 11/2010 | Scheu et al. | |
| 8,375,334 B2 * | 2/2013 | Nakano et al. | 715/848 |
| 8,584,047 B2 * | 11/2013 | Athans et al. | 715/854 |
| 8,860,672 B2 * | 10/2014 | Ewing, Jr. | G06F 1/1686 345/173 |
| 2005/0044509 A1 | 2/2005 | Hunleth | |
| 2005/0091596 A1 * | 4/2005 | Anthony et al. | 715/712 |
| 2006/0212833 A1 | 9/2006 | Gallagher | |
| 2007/0055715 A1 | 3/2007 | Achiwa | |

(Continued)

OTHER PUBLICATIONS

Bailly et al, "MenUA: A Design Space of Menu Techniques," 2009, Available http://www.gillesbailly.fr/menua/index.html.*

(Continued)

*Primary Examiner* — Alvin Tan
(74) *Attorney, Agent, or Firm* — Brooks Acordia IP Law, P.C.

(57) ABSTRACT

A system of displaying hierarchical information in a user interface includes displaying a first plurality of icons aligned in a first arc course on a display device, selecting one of the first plurality of icons using a user input device, rotating the first plurality of icons to position the selected one of the first plurality of icons to a front position of the first arc course in response to the selecting to define a first selection indicator and displaying a second plurality of icons aligned along a second-level arc course, the second-level arc course displayed adjacent to and positioned co-axial with the first arc course, and the second plurality of icons representing sub-hierarchical data for the first selection indicator.

21 Claims, 9 Drawing Sheets

(56) References Cited

U.S. PATENT DOCUMENTS

| | | | |
|---|---|---|---|
| 2008/0215240 A1* | 9/2008 | Howard et al. | 701/213 |
| 2010/0005421 A1* | 1/2010 | Yoshioka | 715/835 |
| 2010/0287505 A1 | 11/2010 | Williams | |
| 2011/0138340 A1* | 6/2011 | Holm-Petersen et al. | 715/854 |

OTHER PUBLICATIONS

Rubio et al, "Floating Pie Menus: Enhancing the functionality of Contextual Tools," 2002, UIST, pp. 39-40.*

Hesselmann et al, "Stacked Half-Pie Menus—Navigating Nested Menus on Interactive Tabletops," Nov. 25, 2009, ITS, pp. 173-180.*

Samp et al, "Supporting menu design with radial layouts," May 29, 2010, ACM.*

Gerber et al, "The Spin Menu: a Menu System for Virtual Environments," Mar. 16, 2005, IEEE, pp. 271-272.*

Bailly et al, "Wave Menus: Improving the Novice Mode of Hierarchical Marking Menus," In Proceedings of the 11th IFIP TC 13 international conference on Human-computer interaction (INTERACT'07), 2007, Springer-Verlag Berlin, Heidelberg.*

Francone et al, "Wavelet Menus on Handheld Devices: Stacking Metaphor for Novice Mode and Eyes-Free Selection for Expert Mode," In Proceedings of the International Conference on Advanced Visual Interfaces (AVI '10), May 29, 2010, ACM, New York, NY, USA.*

US 7,595,802, 09/2009, Nonclercq (withdrawn)

* cited by examiner

SYSTEM FOR DISPLAYING HIERARCHICAL INFORMATION

BACKGROUND

1. Field of the Invention

The field of the invention relates to graphical user interfaces, and more particularly to graphical user interfaces for display of hierarchical information.

2. Description of the Related Art

Cloud computing, search engine, video surveillance and multimedia systems typically make use of systems that are capable of storing large amounts of data in a reliable manner, typically through the use of a RAID (Redundant Array of Independent Disks) array that combines multiple RAID disks into logical units ("LUNs") for file storage. Through the use of LUNS, user data may be divided and distributed across multiple RAID drives and addressed by a network-attached storage ("NAS") server attached to the RAID array by means of block level interfaces such as Fibre Channel ("FC") or the Internet Small Computer System Interface ("iSCSI") for high data throughput. The NAS server is in turn connected to a computer network through powerful network "pipes" that may provide file-based data access to the RAID array to hundreds or even thousands of users over the network.

Unfortunately, the RAID drives and NAS server in a particular integrated system may be manufactured by different companies and so are typically difficult to set up for operation. The RAID drives may have a management interface to configure its operation with the NAS server, and the NAS server may have a management interface to configure it for operation with the network and RAID drives. Some system integrators provide a single management interface to set up the NAS server and RAID array with their product, but a need still exists to present users with an improved management interface in order to provide users with a simple yet powerful set-up for the NAS server and RAID array.

SUMMARY

A method of displaying hierarchical information is disclosed that includes displaying a first plurality of icons aligned in a first arc course on a display device, selecting one of the first plurality of icons using a user input device and rotating the first plurality of icons to position the selected icon to a front position of the first arc course in response to the selecting to define a first selection indicator. The method also includes displaying a second plurality of icons aligned along a second-level arc course, the second-level arc course displayed adjacent to and positioned co-axial with the first arc course and the second plurality of icons representing sub-hierarchical data for the user-selected first selection indicator.

A method of displaying hierarchical information to configure a RAID array and NAS server site is disclosed that includes displaying a first plurality of icons aligned in a first arc course on a display device, at least one of the first plurality of icons representing a plurality of memory storage devices in communication with a NAS server, selecting the at least one of the first plurality of icons using a user input device, rotating the first plurality of icons to position the selected one of the first plurality of icons to a front position of the first arc course in response to the selecting, and displaying a second plurality of icons aligned along a second-level arc course, the second-level arc course displayed adjacent to and positioned co-axial with the first arc course, and each of the second plurality of icons representing a respective memory storage device.

An apparatus is also disclosed that includes a display device to display a first plurality of icons aligned in a first arc course, a user input device to enable a user to select one of the first plurality of icons, and a network-attached storage (NAS) server configured to visually rotate the first plurality of icons to position the selected one of the first plurality of icons to a front position on the display device in response to a user selecting the one of the first plurality of icons, the one of the first plurality of icons thus defined as a first selection indicator. The NAS server is further configured to display a second plurality of icons aligned along a second-level arc course, the second-level arc course displayed adjacent to and positioned co-axial with the first arc course and the second plurality of icons representing sub-hierarchical data for the first selection indicator.

BRIEF DESCRIPTION OF THE DRAWINGS

The components in the figures are not necessarily to scale, emphasis instead being placed upon illustrating the principals of the invention. Like reference numerals designate corresponding parts throughout the different views.

DETAILED DESCRIPTION

A system is described of displaying hierarchical data in a simulated 3-D graphical user interface. Although particularly adapted for use with a NAS server and RAID array system, the system may be used in any electronic or computer system that allows a user to initially set up, and/or configure system components that may be described as hierarchical in nature. In the following discussion, the word "icon" means any symbol, word, design, image or a combination of the same that represents a physical object, such as a RAID drive or person, or any logical structure, such as a LUN or a collection of LUNs in an array of RAID drives. The phrase "arc course"

(alternatively called an "arc path") is intended to encompass a visual path that may or may not be delineated with a visible line.

Figure 1:
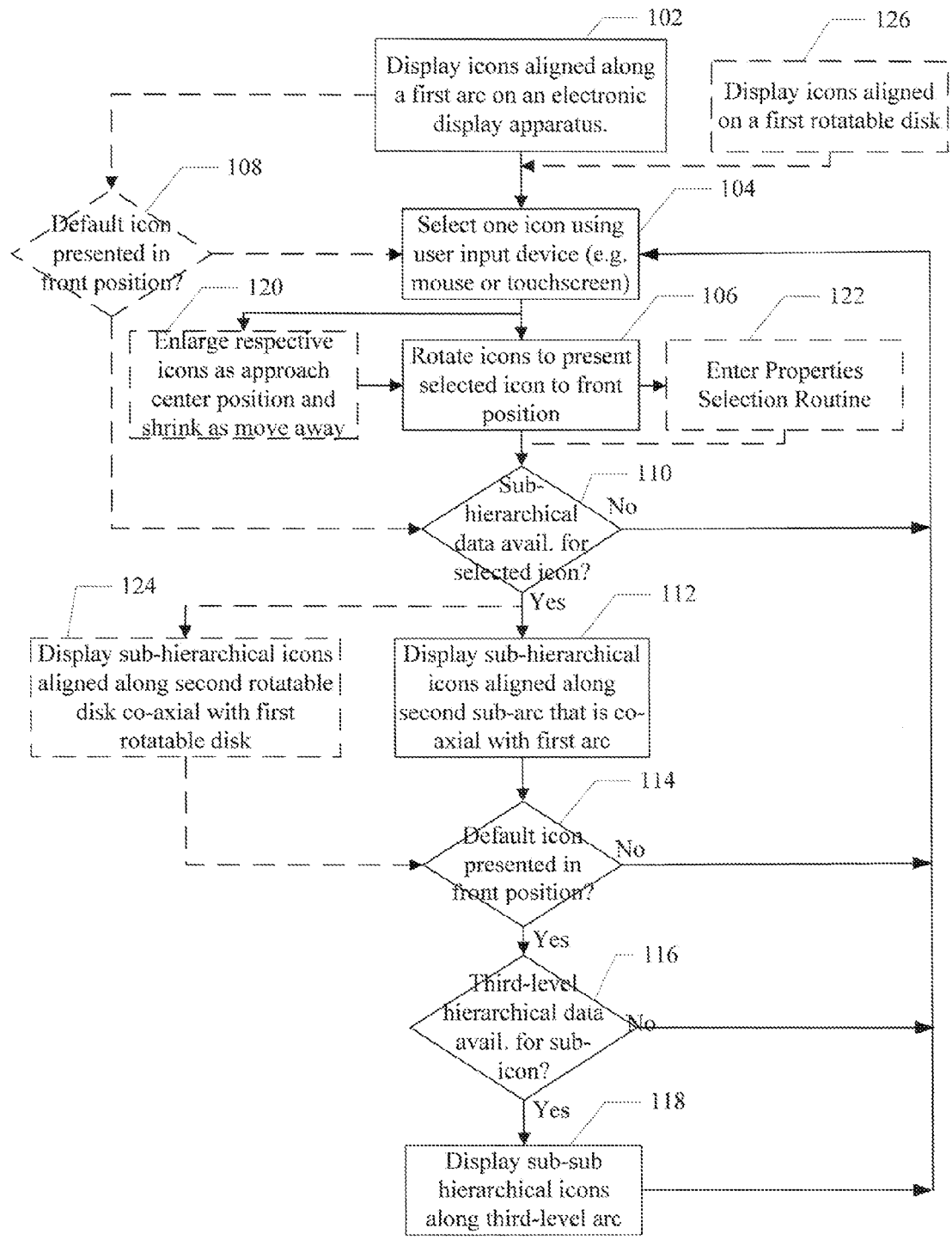
FIG. 1 is a flow diagram illustrating one embodiment of a method for displaying hierarchical data.

FIG. 1 illustrates one embodiment of a method for selecting and displaying hierarchical information on a display device. A set of icons is preferably aligned along a first arc course for display on a display apparatus (block 102) and an icon is selected by the user (block 104) using a user input device such as a mouse that is in communication with a server. Or, the icon may be selected through the use of a touch-screen device, pointer device, by way of keyboard selection or through the use of any other device that allows a user to select the displayed icon. In response to the icon selection, the plurality of icons aligned along the first arc course, including the selected icon, is rotated to create the impression of movement of the selected icon towards the observer to present the selected icon to a front position (block 106). In one embodiment, a default icon is presented in the front position (block 108) prior to selection, and if second-level hierarchical data is available for that default icon (block 110), the associated and second-level hierarchical data is represented by icons displayed aligned along a second-level arc course that is stacked adjacent to and positioned co-axial with the first arc course (block 112), preferably with the arcs having a spacing between them. Similarly, if a default icon is presented in a front position of the second-level arc course (block 114) and third-level hierarchical data is available for that default icon (block 116), then the associated third-level icon or plurality of third-level icons are displayed along a third-level arc course (block 118) that is preferably displayed stacked adjacent to and positioned co-axial with the first and second arc courses.

As the set of icons is rotated along the first arc course to present the selected icon to the front position, each respective icon is proportionally emphasized, such as by enlarging, highlighting, bolding or through other visual emphasis, as it approaches the center position (block 120) to create the impression of movement of each respective icon towards the observer. Similarly, as each respective icon moves away from the center position, each respective icon is de-emphasized such as by shrinking, diming or through other visual de-emphasis (block 120) to create the impression of movement away from the observer. The selected icon may be selected a second time to enter a properties selection routine, alternatively referred to as a detail pane (block 122), to display detailed information associated with the selected icon.

The plurality of icons, second-level icons and third-level icons are each aligned along respective arc courses, with each arc course following a partial perimeter of a circle, or a partial perimeter of a bow shape, or following respective arc courses that are shaped in alternative shapes but that are collectively displayed co-axially and spaced apart from one another. In an alternative embodiment, the plurality of icons may appear to be coupled to rotatable and co-axial disks (block 126) rather than merely aligned in an arc course. In such an embodiment, for example, if second-level hierarchical data is available for a selected icon (block 110), sub-hierarchical icons are displayed as coupled to the second rotatable disk that is itself co-axial with the first rotatable disk (block 124). In preferred embodiments, each of the plurality of icons aligned along a given arc or coupled to a given disk are not simultaneously available for view by a user, but rather become visible or disappear as they rotate towards and away from the front position, respectively, such as by proportionally de-emphasizing each respective icon as it moves away from the front position and emphasizing each respective icon as it moves towards the front position. So, as an icon is rotated away from a front position, it may rotate sufficiently far so as to be visibly removed from the user's sight such as by shrinking, visibly fading the icon by selectively changing its display brightness or contrast, or through other means.

Figure 2:
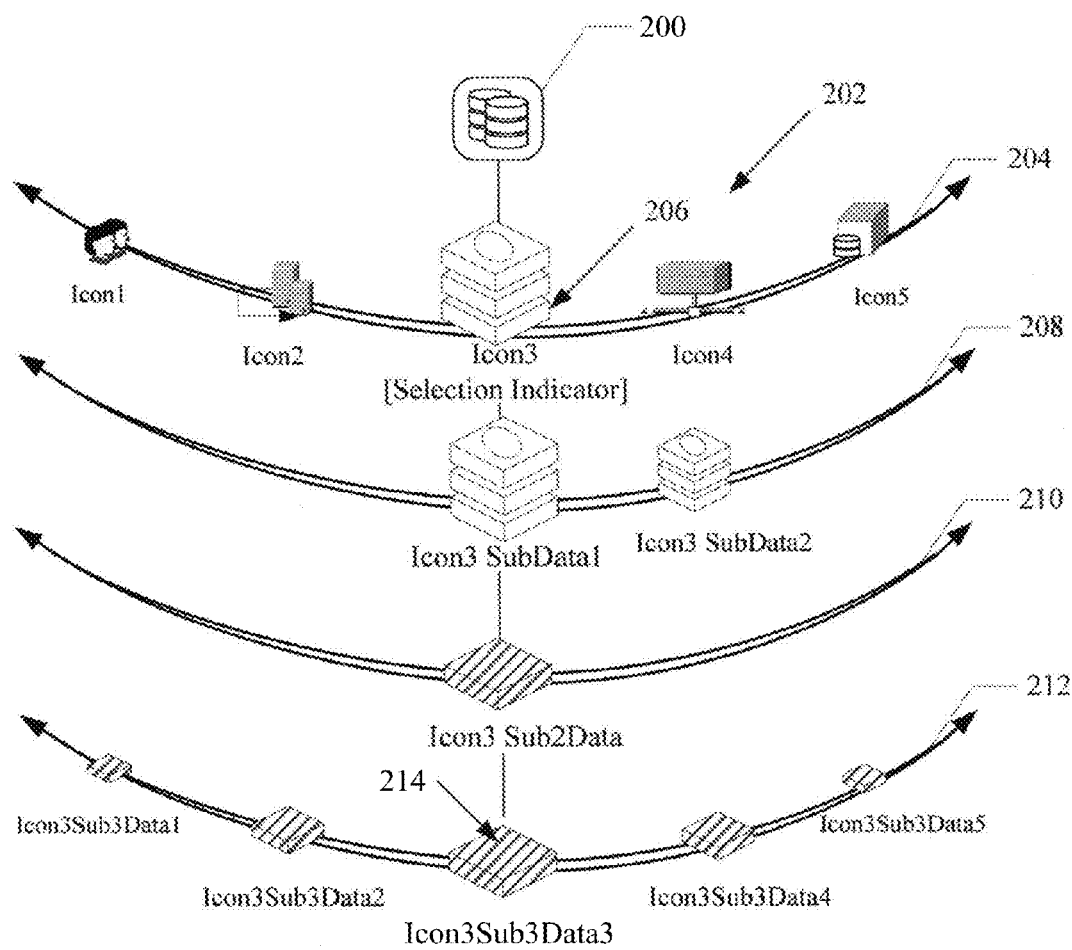
FIG. 2 is a perspective view of a graphical user interface that has, in one embodiment, icons displayed in co-axially aligned and stacked arc courses on rotatable and co-axial disks.

FIG. 2 illustrates one embodiment of a system for displaying hierarchical information that uses icons displayed in co-axially aligned and stacked arc courses. Selection of an icon in a first-level arc course results in a plurality of icons displayed in a second-level arc course that each represents sub-hierarchical information for the selected icon from the first-level arc course. More particularly, a top-level icon 200 identifies the general subject matter of the collective hierarchical information. A set of first-level icons (Icon1, Icon2 . . . Icon5) 202 is spaced apart and positioned along the outer perimeter of a first arc course that is preferably a thin and partially-visible first disk 204 having a radius and width. In an alternative embodiment, the first-level icons 202 are coupled to a non-circular bowed disk (i.e. varying radius) or a disk having another shape. Or, the first-level icons are not coupled to a partially-visible first disk, but rather are displayed spaced apart and aligned in an arc course without visible coupling to a disk. Icon3 is illustrated in a front position and so serves as a selection indicator 206. Icon3 is emphasized by size, with Icon2 visibly smaller than Icon3, and Icon1 smaller still than Icon2. During operation, the visual emphasis for a particular icon depends on its relative position to the selection indicator position 206. For example, if icons on the first disk 204 are rotated clockwise, Icon3 would be deemphasized as it rotates with the first disk 204 away from the selection indicator position, and Icon4 and Icon5 would be emphasized, such as by enlarging, as they each approached the selection indicator position to create the impression of movement of Icon4 and Icon5 towards the observer. As illustrated in FIG. 2, the icons are emphasized or de-emphasized using relative sizing. Or, they may be emphasized or de-emphasized using relative brightness or contrast as between the icons, relative color intensity as between icons, relative opaqueness or through other means to emphasize the relative position of each respective icon in relation to the front position/selection indicator position. In a preferred embodiment, the icons are displayed positioned along the outer perimeter of the first disk 204 and so rotate with the first disk 204 as if coupled to it. In an alternative, embodiment, they may slide along the arc course in a non-linear translation motion, moving more or less rapidly as they approach the selection position 206 in order to emphasize or deemphasize the icon, as appropriate.

Icon3 SubData1 and Icon3 SubData2 are displayed aligned on a second-level arc course on a second-level disk 208 that is displayed stacked and co-axial with the first disk 204 in response to Icon3 being the selection indicator. As their labels suggest, Icon3 SubData1 and Icon3 SubData 2 each represent sub-hierarchical data available for Icon3. For example, if Icon3 represents the category "memory storage devices," Icon3 SubData1 and Icon3 SubData2 may each represent physical memory storage devices. If Icon4 is selected by the user and so rotated into the Selection Indicator position, Icon3 SubData1 and Icon3 SubData2 would not be displayed unless they also represented sub-hierarchical data for Icon4. As illustrated in FIG. 2, Icon3 SubData1 has one available set of sub-hierarchical that is labeled Icon3 Sub2Data on a third-level disk 210 and along what would be a third-level arc course if a plurality of icons were present to mark the course. Icon3 Sub2Data is illustrated with five sub-hierarchical elements on a fourth-level disk 212 along a fourth-level arc course: Icon3 Sub3Data 1, Icon3 Sub3Data 2, Icon3 Sub3Data 3, Icon3 Sub3Data 4 and Icon3 Sub3Data 5 ("fourth-level icons"). As for the first-level icons on the first disk 204, the fourth-level icons may be rotated with the fourth-level disk 212 as either one of the fourth-level icons is selected by the user and so rotated to a front selection indicator position 214. Icon3Sub3Data 3 is illustrated as the front selection indicator 214. Because no sub-hierarchical information is available for Icon3Sub3Data 3, no icons are displayed beneath it. If sub-hierarchical information was available, appropriate icons would be displayed along a fifth-level arc course (not shown), and in a preferred embodiment, would be illustrated on a fifth-level rotatable disk that is stacked beneath and co-axially aligned with the fourth-level disk 212.

In a preferred embodiment, each icon is visually representative of the data which it represents. For example, Icon1 is illustrated as two heads in silhouette and so may represent individuals such as system administrators, users or other individuals with system responsibility or access. Icon3 is illustrated as stacked plurality of prism and so may represent a component or plurality of components of the system.

Figure 3:
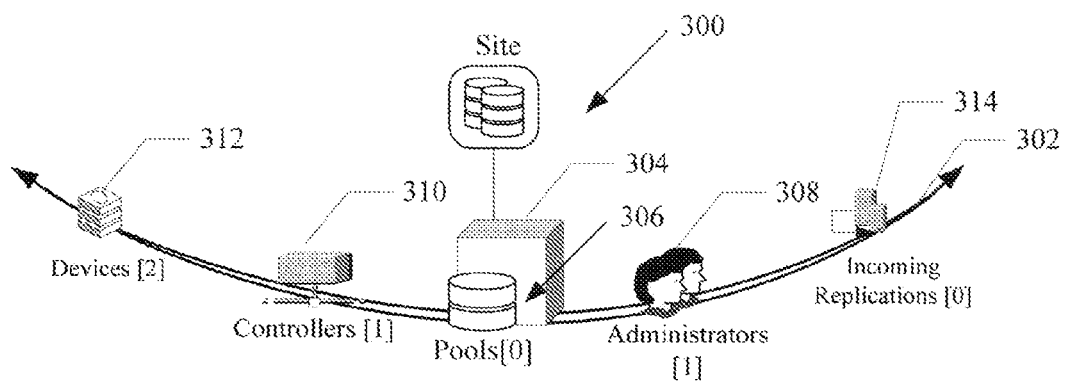
FIGS. 3 and 4 are perspective views of a graphical user interface for displaying hierarchical information used to configure and maintain a RAID array and NAS server site.
Figure 4:
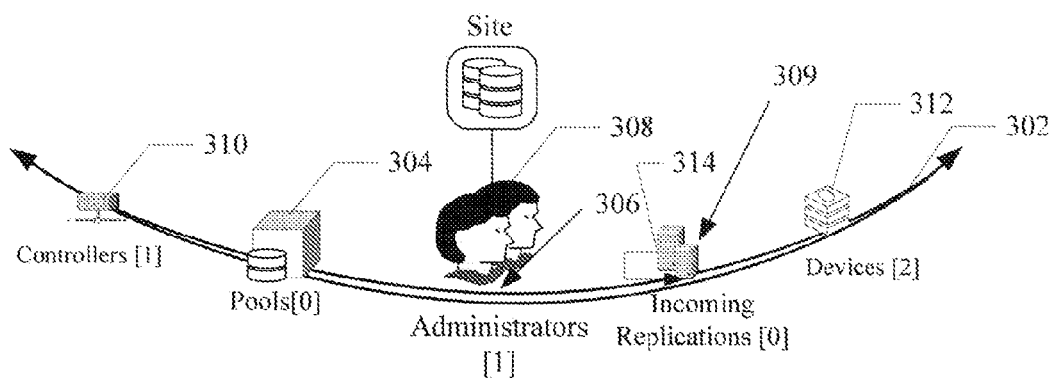

FIGS. 3 and 4 illustrate a system for displaying hierarchical information used to configure and maintain a RAID array and NAS server 300 (collectively the "Site"). A plurality of icons representing information descriptive of the RAID array and NAS server Site 300 are spaced apart and positioned along the outer perimeter of a first arc course that is preferably a thin and partially-visible circular disk 302. In FIG. 3, a Pools[0] icon 304 is illustrated in the selection position 306 and is labeled to visually represent 'zero' pools currently configured in the system 300. Consequently, no second-level icons are displayed immediately below the Pools[0] icon 304. An Administrators[1] icon 308 and a Controllers[1] icon 310 are also displayed in the first arc course along the outer perimeter of the circular disk 302, and are preferably deemphasized in size relative to the size of the Pools[0] icon 304 to better communicate that the Pools[0] icon 304 is positioned in the front selection position 306. A Devices[2] icon 312 and Incoming Replications[0] 314 are also displayed on the outer perimeter of the circular disk 302, with the Devices[2] and Incoming Replications[0] icons (312, 314) visually deemphasized in size relative to the Controllers[1] and Administrators[1] icons (310, 308).

In FIG. 4, the Administrators[1] icon 308 has been selected by the user using a user input device such as a mouse, thereby rotating the disk to bring the Administrators[1] icon 308 to the front selection position 306. The remainder of the icons (310, 304, 314 and 312) are rotated with the Administrators[1] icon 308 as if coupled to the disk 302, and are suitably emphasized/deemphasized as they rotate towards and away from the front selection position 306, respectively, on the disk 302. For example, the Administrators[1] icon is progressively enlarged in size as it rotates from a disk mid position 309 to the front selection position 306. As the disk 302 is rotated clockwise to bring the Administrators[1] to the front selection position 306, the Devices[2] icon 312 (FIG. 3) preferably rotates out of view to make room for additional icons to be brought into view from the opposite side of the disk. If appropriate, such as if spacing allows on the visible portion of the disk 302, the Devices[2] 312 icon is rotated out of view on one side (FIG. 3) and is visually reintroduced via rotation of the disk 302 to the opposite side of the disk 302 (FIG. 4). In an alternative embodiment, the emphasis/de-emphasis is accomplished by visibly fading the icon by selectively changing its display brightness or contrast, or through other visual means.

Figure 5:
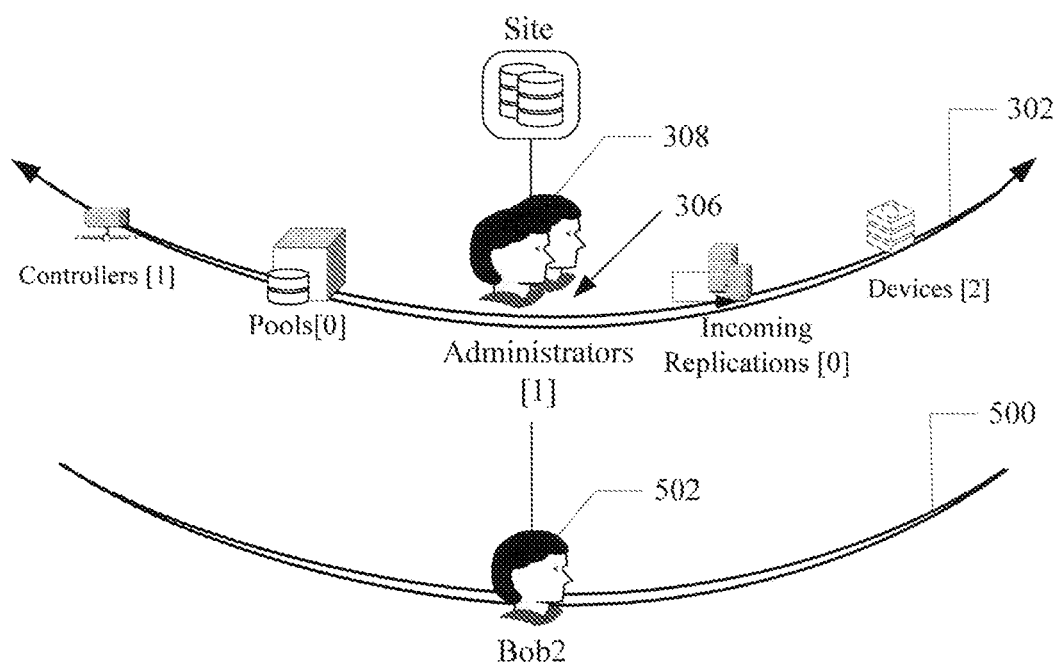
FIG. 5 is a perspective view of a graphical user interface that illustrates second-level hierarchical data aligned along a second arc course that preferably follows the shape of a partial perimeter of a circle.

FIG. 5 illustrates second-level hierarchical data aligned along a second arc course that preferably follows the shape of a partial perimeter of a circle and that is visually coupled to a second disk 500. The second rotatable disk 500 is preferably stacked adjacent to and positioned co-axial with the first arc course 302. Icon Bob2 502 is in a front position of the second-level arc course along the second disk 500, with its position in the front position indicative of its role as a second-level selection indicator. Icon Bob2 represents sub-hierarchical data for the Administrators[1] icon 308 that is in the front selection position 306 (the first selection indicator). In one example, although the Administrators[1] icon indicates one Administrator exists and so sub-hierarchical data exists, the second-level disk and associated second-level icons are not displayed (FIG. 4) until the Administrators[1] icon is again selected by the user (FIG. 5) through a user input device. Or, the second-level second disk 500 is automatically displayed in response to selection of the Administrators[1] icon 308 as a result of the existence of its sub-hierarchical data (Bob2 502).

Figure 6:
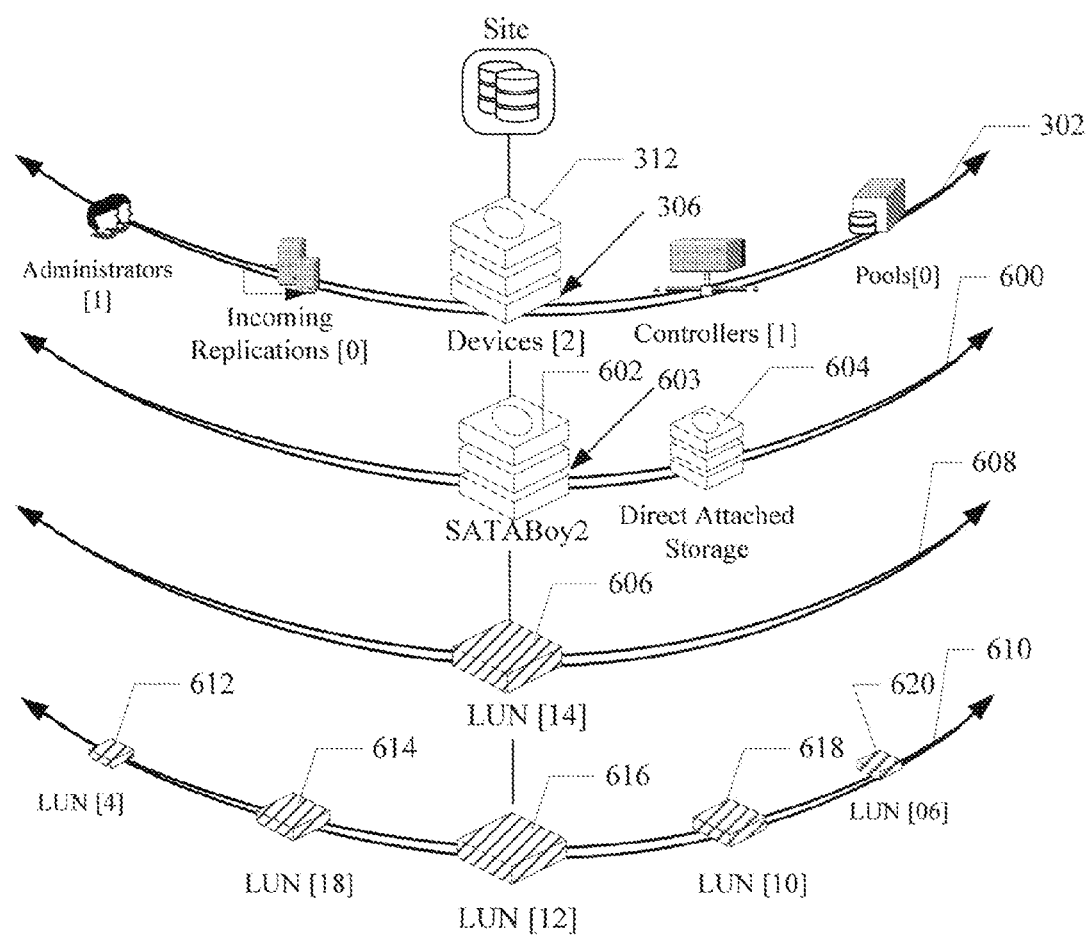
FIG. 6 illustrates the graphical user interface of FIG. 5, after selection by the user of a Devices[2] icon having sub-hierarchical data available for display.

In FIG. 6, the Devices[2] icon 312 has been selected by the user through a user input device such as a mouse, track pad or touch-screen device, thereby rotating the first-level icons on the first disk 302 to bring the Devices[2] icon 312 to the front selection position 306. In the illustrated embodiment, the Devices[2] icon 312 is intended to communicate the availability of two pieces of second-level hierarchical data available for display on a second rotatable disk 600 that tracks a second-level arc course. The second rotatable disk 600 is positioned co-axial with the first rotatable disk 302. The SATABoy2 icon 602 (representing a Serial ATA device in communication with the NAS server) is in a front position indicative of its role as a second-level selection indicator in a second front selection position 603 and is along the second-level arc course on the visible second rotatable disk 600. A Direct Attached Storage icon 604 is also positioned along the second-level arc course on the second-level disk 600 to illustrate its availability as sub-hierarchical data. The SATABoy2 icon 602 and Direct Attached Storage icon 604 visually represent a SATA RAID device and memory storage device, respectively, and are selectable by a user to further configure or modify them as part of the Devices[2] information grouping. In an alternative embodiment, the SATABoy2 and Direct Attached Storage icons (602, 604) may represent other configurable or non-configurable hardware components. Because the SATABoy2 icon 602 is the second-level selection indicator and has sub-hierarchical data available to it, a third-level disk 608 hierarchically associated with the SATABoy 2 icon is displayed on a third-level arc course that is displayed adjacent to and positioned co-axial with the first and second arc courses. For convenience, a LUN[14] icon 606 is pre-positioned as a third-level section indicator. The "[14]" text alongside the LUN icon 606 is intended to indicate fourteen units of sub-hierarchical data, although the icon need not display whether sub-hierarchical data is available.

In a preferred embodiment, because sub-hierarchical data is available for the LUN[14] icon 606, a fourth rotatable disk 610 is displayed along on a fourth-level arc course that is itself is adjacent to and positioned co-axial with the first, second and third arc courses (i.e. 302, 600 and 608). As illustrated in FIG. 6, the number of sub-hierarchical icons available for display is greater than the space available on the visible portion of the fourth rotatable disk 610. Icons LUN[4], LUN[18], LUN[12], LUN[10] and LUN[06] (612, 614, 616, 618 and 620) are initially displayed, although different default icons may also be displayed. In an alternative embodiment, the fourth rotatable disk 610 and associated icons are not automatically displayed with user selection of the SATABoy2 icon 602, but rather is only displayed upon the user's selection of the LUN[14] icon 606.

Figure 7:
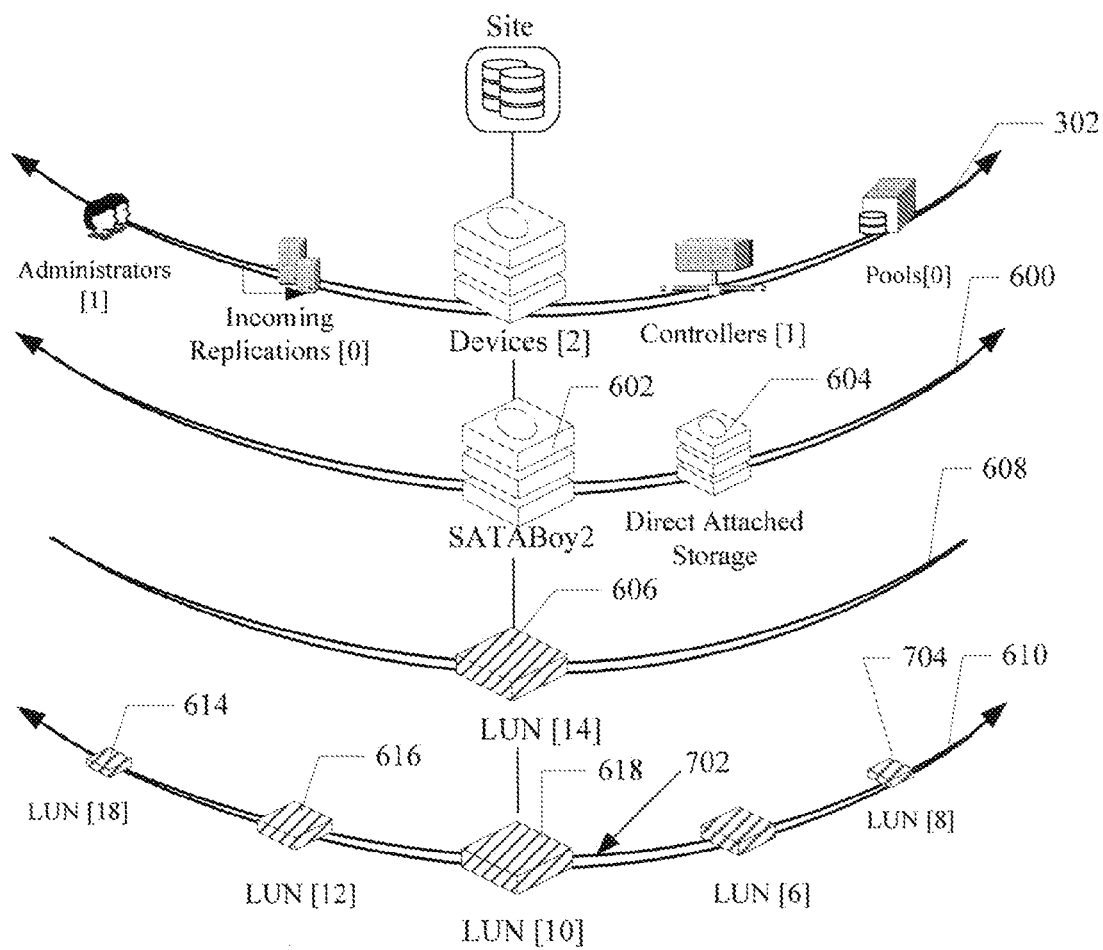
FIG. 7 illustrates the graphical user interface of FIG. 5, after selection by the user of a fourth-level user icon to rotate the fourth rotatable disk clockwise to visually move the icon towards the user/observer to a fourth front selection position.

In FIG. 7, the system of FIG. 6 is illustrated after user selection of the LUN[10] icon 618 resulting in rotation of the fourth rotatable disk 610 clockwise to visually move the LUN[10] icon 618 towards the user/observer to a fourth front selection position 702. The LUN[10] icon is emphasized by increasing its size as it is rotated to the fourth front selection position 702, and the LUN[12] and LUN[18] icons (616, 614) are deemphasized by proportionally reducing their respective sizes as they move away from the fourth selection indicator 702. LUN[4] is visibly rotated off an end of the visible partial perimeter of the fourth rotatable disk 610. LUN[8] icon 704 is added onto the fourth rotatable disk 610 as proportionate spacing becomes available on the arc course of the fourth rotatable disk 610.

Figure 8A:
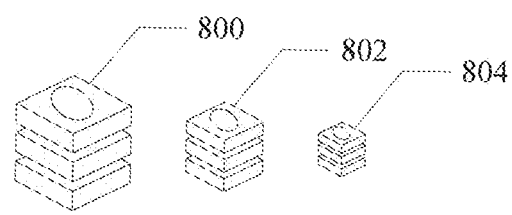
FIGS. 8A, 8B and 8C illustrate alternative embodiments for selectively emphasizing/de-emphasizing icons for use in creating the impression of movement towards and away from an observer, respectively.
Figure 8B:
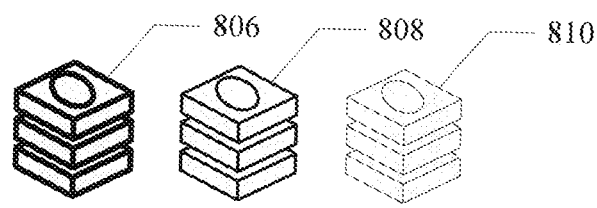
Figure 8C:
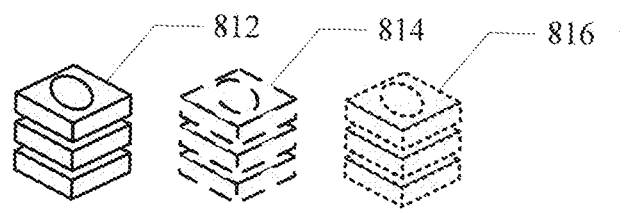

FIGS. 8A, 8B and 8C illustrate three embodiments for selectively emphasizing/de-emphasizing icons in the systems illustrated in FIGS. 1-7. In a preferred embodiment illustrated in FIG. 8A, icons such as those used for SATABoy2 and Direct Attached Storage icons (602, 604) are illustrated having three different sizes, such as for use closer to a front position of a arc course 800 (larger icon), farther from the front position 802 and furthest from the front position 804 (smaller icons). As used herein, the size of the icon connotes distance from a user. As the icon moves away from a front position, its size is reduced to create the impression of movement away from an observer, or may be stepped from largest to smallest icon rather than smoothly reduced in size. As the icon moves towards the front position, emphasis is created by increasing its size to create the impression of movement towards the observer.

In alternative embodiments illustrated in FIGS. 8B and 8C, icons such as those used for SATABoy2 and Direct Attached Storage icons (602, 604) are illustrated having different drawing characteristics to emphasize or de-emphasize an icon as it moves closer or farther away from a front position, respectively. In FIG. 8B, three different drawing line widths are used to create the impression of movement. An icon that is in the front position of an arc course 806 has the thickest relative line width, icons farther from the front position 808 have a narrower relative line width and icons farthest from the front position 810 have the thinnest relative line width. In a further alternative embodiment illustrated in FIG. 8C, icons are emphasized or de-emphasized using different drawing line patterns. An icon that is in the front position of an arc course is illustrated with solid lines 806, icons farther from the front position are illustrated with a dashed lines 812 and icons farthest from the front position 814 are illustrated with dotted lines 816.

Figure 9:
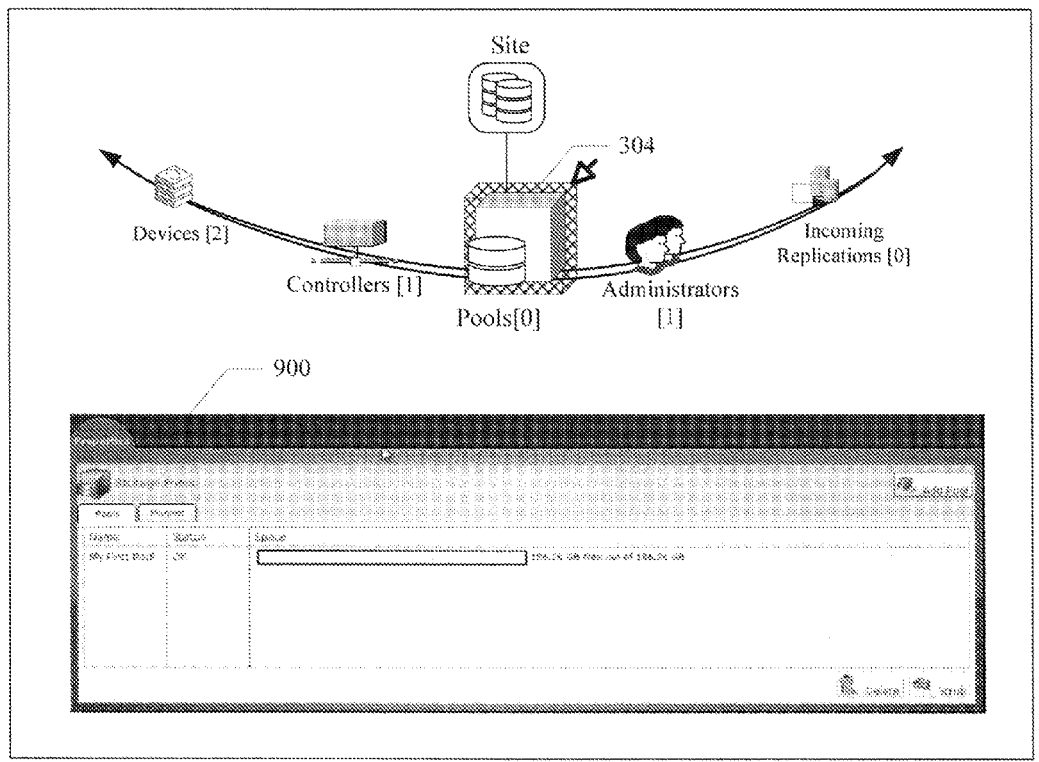
FIG. 9 illustrates the graphical user interface of FIG. 3, after selection by the user of the Pools[0] icon to visually introduce a properties tab for the Pools[0] data.

FIG. 9 illustrates display of graphical user interface first illustrated in FIG. 3, after a user has selected the Pools[0] icon 304 to initiate a properties selection routine, such as displayed by properties dialogue box 900. The properties dialogue box 900 provides more detailed information than would be available on the Pools[0] icon 304 itself, and may be used to otherwise configure data collectively associated with the icon. For example, the properties dialogue box 900 may allow a user to change the name of the pool, monitor performance characteristics of the pool and observe information related to its status. In a preferred embodiment, the properties dialog box 900 for the Pools[0] icon would allow a user to add new pools to the Site.

Figure 10:
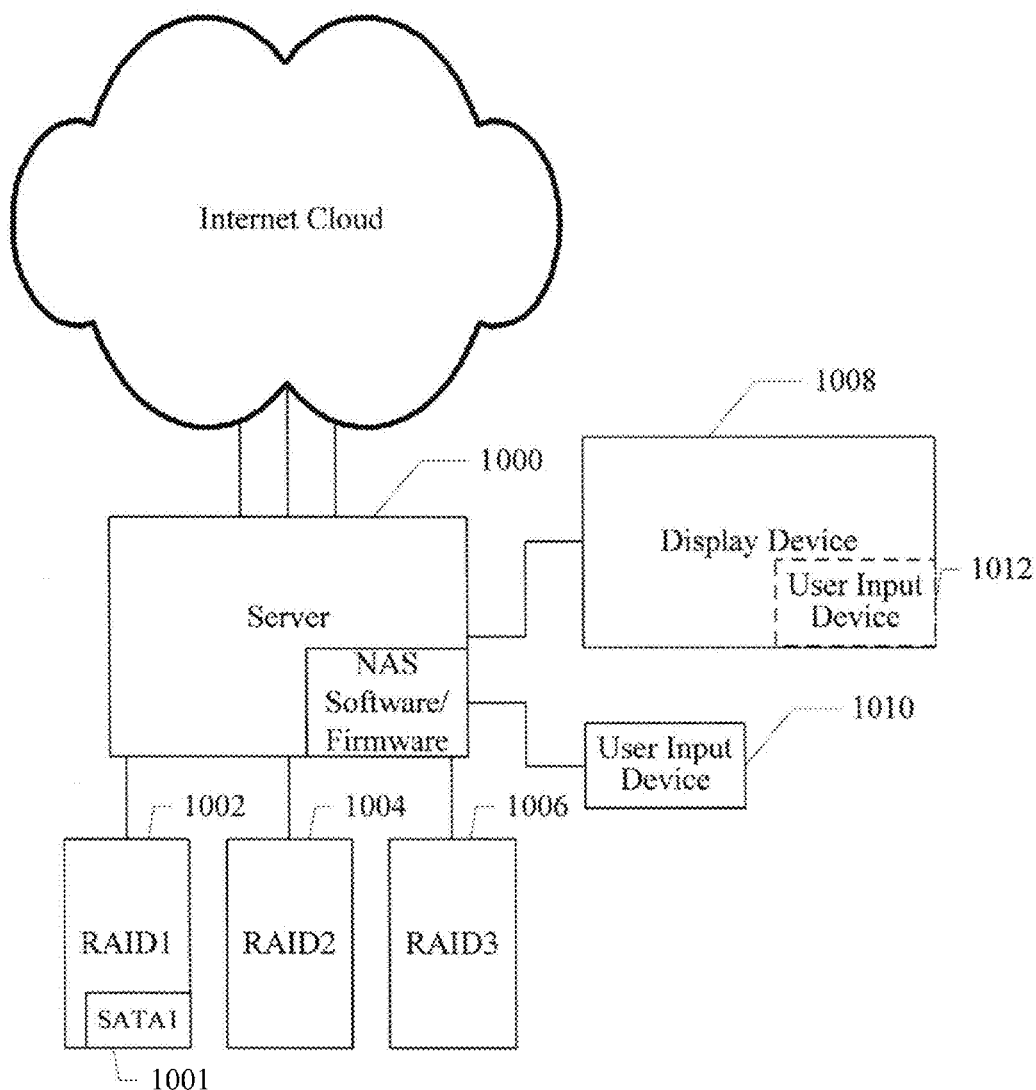
FIG. 10 is a block diagram illustrating one embodiment of a system to display hierarchical data in a NAS server and RAID array system.

FIG. 10 illustrates one embodiment of a NAS server and RAID array system having NAS software/firmware configured to display hierarchical data on a display device. A NAS server 1000 is connected to the Internet through network pipes to provide file-based data access to an array of RAID drives (1002, 1004, 1006). A SATA device 1001 in at least one of the RAID drives 1002 is in communication with the NAS server 1000, the NAS server 1000 configured to display hierarchical data for the SATA device 1001 with suitable icons displayed along at least one arc course, preferably on a display device 1008 such as a display monitor or computer tablet. The display device would also display a suitable plurality of icons in a top-level, or first arc course, if the SATA device is best described in sub-hierarchical arc course. A user input device 1010, preferably a computer mouse or touchpad device, is in communication with the NAS Server 1000 to enable a user to select icons displayed on the display device 1010 to either rotate the selected icon to a front position of the arc course or to display further properties associated with the selected icon. In an alternative embodiment, the user input device is a pressure-sensitive or capacitive-sensitive display screen 1012 that is configured to accept user input directly on the display device 1008 rather than through a computer mouse.

More particularly, the NAS server 1000 is configured to visually rotate a plurality of icons representing data to position a user-selected icon to a front position of a first-level arc course on a display device. As illustrated in FIGS. 6-7, the SATA device may be represented by SATABoy2 icon 602 on the second-level arc course 600 hierarchically under a Devices[2] icon 312. The NAS server 1000 is further configured to display at least one third-level icon representing sub-hierarchical data for the SATA device, such as the LUN[14] icon 606, on a third-level arc course 608 displayed adjacent to and positioned co-axial with the first and second arc courses (302, 600), the at least one third-level icon positioned in a front position of said third-level arc course to define a third-level selection indicator. The NAS server is further configured to display a plurality of fourth-level icons on a fourth-level arc course 610 displayed adjacent to and positioned co-axial with said first, second and third arc courses (302, 600, 608), the plurality of fourth-level icons representing hierarchical data for the third-level selection indicator.

We claim:

1. A method of displaying hierarchical information, comprising
    displaying a first plurality of icons aligned in a first arc course on a display device, the first arc course displayed as a two-dimensional representation of a three-dimensional arc course in a first plane;
    selecting one of said first plurality of icons using a user input device;
    rotating said first plurality of icons to position said selected one of said first plurality of icons to a front position of said first arc course towards an observer in response to said selecting to define a first selection indicator;
    displaying a second plurality of icons aligned along a second-level arc course, said second-level arc course displayed as a two-dimensional representation of a three-dimensional arc course in a second plane, said second-level arc course displayed stacked adjacent to, and positioned co-axial with said first arc course and said second plurality of icons representing sub-hierarchical data for said first selection indicator;
    wherein the first and second arc courses are displayed using a two-dimensional visualization of three-dimensional co-axial arc courses that are separated from each other by a distance measured approximately orthogonal to the first and second planes, and the first and second arc courses having approximately identical radii of curvature along their respective lengths.

2. The method of claim 1, wherein said displaying a first plurality of icons aligned along a first arc course further comprises displaying a first plurality of icons along a perimeter of a first rotatable disk having a width.

3. The method of claim 2, wherein said displaying a second plurality of icons aligned along a second-level arc path further comprises displaying a second plurality of icons along a perimeter of a second rotatable disk having a width and positioned co-axial with said first rotatable disk.

4. The method of claim 3, wherein said first rotatable disk and said second rotatable disk are separated by a distance between a bottom surface of said first rotatable disk and a top surface of said second rotatable disk.

5. The method of claim 3, wherein an entire perimeter of said first rotatable disk is visible.

6. The method of claim 3, wherein only a portion of a perimeter of said first rotatable disk is visible.

7. The method of claim 1, further comprising:
selecting one of said second plurality of icons along said second-level arc course; and
rotating said one of said second plurality of icons to a front position of said second-level arc course in response to said selecting to define a second-level selection indicator.

8. The method of claim 7, further comprising:
displaying a third plurality of icons aligned along a third-level arc course, said third-level arc course displayed stacked adjacent to and positioned co-axial with said first arc course and said second-level arc course, said third plurality of icons representing sub-hierarchical data for said second-level selection indicator.

9. The method of claim 1, further comprising selectively emphasizing each respective one of said first plurality of icons as each icon moves closer to said front position and de-emphasizing each respectively one of said first plurality of icons as each icon moves away from said front position.

10. The method of claim 9, wherein said selectively highlighting comprises enlarging each respective one of said first plurality of icons to create the impression of movement towards an observer.

11. The method of 1, further comprising:
selecting a detail pane associated with one of said first plurality of icons to display associated information.

12. The method of claim 1, further comprising:
selecting a second one of said first plurality of icons; and
rotating said first plurality of icons to present said second one of said first plurality of icons to said front position.

13. The method of claim 1, wherein said rotating said first plurality of icons further comprises:
removing at least one of said first plurality of icons as said at least one of said first plurality of icons is visibly rotated off an end of said first arc course; and
adding at least one new icon to said first arc course as proportionate spacing becomes available on said first arc course.

14. The method of claim 1, wherein said first arc course forms one of a partial perimeter of a circle and a partial perimeter of a bow shape.

15. An apparatus for displaying hierarchical information, comprising:
a display device to display a first plurality of icons aligned in a first arc course displayed as a two-dimensional representation of a three-dimensional arc course in a first plane;
a user input device to enable a user to select one of said first plurality of icons; and
a network-attached storage (NAS) server configured to visually rotate said first plurality of icons to position said selected one of said first plurality of icons to a front position on said display device in response to a user selecting said one of said first plurality of icons, said one of said first plurality of icons thus defined as a first selection indicator, said NAS server further configured to display a second plurality of icons aligned along a second-level arc course, said second-level arc course displayed as a two-dimensional representation of a three-dimensional arc course in a second plane and stacked adjacent to and positioned co-axial with said first arc course and said second plurality of icons representing sub-hierarchical data for said first selection indicator;
wherein the first and second arc courses represent two-dimensional visualization of three-dimensional co-axial arc courses separated by a distance measured approximately orthogonal to the first and second planes, and the first and second arc courses having approximately identical radii of curvature along their respective lengths.

16. The apparatus of claim 15, further comprising:
a serial ATA (SATA) device in communication with said NAS server, said SATA device represented by a SATA icon on said second-level arc course on said display device, and wherein said NAS server is configured to visually display at least one third-level icon representing hierarchical data for said SATA device on a third-level arc course displayed stacked adjacent to and positioned co-axial with said first and second arc courses, said at least one third-level icon positioned in a front position of said third-level arc course to define a third-level selection indicator.

17. The apparatus of claim 16, wherein said NAS server is further configured to display a plurality of fourth-level icons on a fourth-level arc course displayed stacked adjacent to, and positioned co-axial with said first, second and third arc courses, said plurality of fourth-level icons representing hierarchical data for said third-level selection indicator.

18. The apparatus of claim 15, further comprising:
a direct attached storage device in communication with said NAS server, said NAS server configured to display a direct attached storage icon on said second arc course in response to a user selecting a devices icon displayed on said first arc course.

19. A method of displaying hierarchical information to configure a RAID array and NAS server site, comprising:
displaying a first plurality of icons aligned in a first arc course, said first arc course displayed as a two-dimensional representation of a three-dimensional arc course in a first plane on a display device, at least one of said first plurality of icons representing a plurality of memory storage devices in communication with a NAS server;
selecting said at least one of said first plurality of icons using a user input device;
rotating said first plurality of icons to position said selected one of said first plurality of icons to a front position of said first arc course in response to said selecting; and
displaying a second plurality of icons aligned along a second-level arc course, said second-level arc course displayed as a two-dimensional representation of a three-dimensional arc course in a second plane and stacked adjacent to and positioned co-axial with said first arc course, and each of said second plurality of icons representing a respective memory storage device;
wherein the first and second arc courses are displayed using a two-dimensional visualization of three-dimensional co-axial arc courses that are separated from each other by a distance measured approximately orthogonal to the first and second planes, and the first and second arc courses having approximately identical radii of curvature along their respective lengths.

20. The method of claim 19, further comprising:
selecting one of said second plurality of icons, said one of said second plurality of icons representing a first memory storage device; and
displaying a third-level icon on said display device, said third-level icon representing a logical unit ("LUN") in said first memory storage device.

21. A method of displaying hierarchical information, comprising:
displaying a top-level icon representing subject matter of a collective hierarchical information;
displaying a first plurality of icons aligned in a first arc course on a display device, the first arc course orbiting about the top-level icon;
selecting one of said first plurality of icons using a user input device;
rotating said first plurality of icons to position said selected one of said first plurality of icons to a front position of said first arc course in response to said selecting to define a first selection indicator;
displaying a second plurality of icons aligned along a second-level arc course, said second-level arc course displayed stacked adjacent to, and positioned co-axial with said first arc course and said second plurality of icons representing sub-hierarchical data for said first selection indicator, wherein said first and second arc courses are displayed as two-dimensional representations of respective three-dimensional arc courses that are separated from each other by a distance, and the first and second arc courses having approximately identical radii of curvature along their respective lengths.

* * * * *